United States Patent
Kobayashi

(10) Patent No.: US 11,128,799 B2
(45) Date of Patent: Sep. 21, 2021

(54) IMAGE PROCESSING APPARATUS AND IMAGE PROCESSING METHOD

(71) Applicant: CANON KABUSHIKI KAISHA, Tokyo (JP)

(72) Inventor: Takashi Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/729,773

(22) Filed: Dec. 30, 2019

(65) Prior Publication Data

US 2020/0221028 A1 Jul. 9, 2020

(30) Foreign Application Priority Data

Jan. 7, 2019 (JP) ............................. JP2019-000740

(51) Int. Cl.
*H04N 5/232* (2006.01)
*H04N 5/235* (2006.01)

(52) U.S. Cl.
CPC ....... *H04N 5/23248* (2013.01); *H04N 5/2353* (2013.01); *H04N 5/2357* (2013.01)

(58) Field of Classification Search
CPC . H04N 5/23248; H04N 5/2357; H04N 5/2353
See application file for complete search history.

(56) References Cited

U.S. PATENT DOCUMENTS 7,289,144 B2 * 10/2007 Arazaki ................ H04N 5/235
348/228.1

FOREIGN PATENT DOCUMENTS

JP 2014-179924 A 9/2014

* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

An image processing apparatus that can accurately detect and/or suppress flicker in multiple images with different exposure conditions using a simple configuration is provided. The apparatus acquires a plurality of image data captured using different exposures; selects an image data on which flicker noise detection is to be performed among the plurality of image data; applies flicker noise detection processing to the image data selected by the selection unit; computes, if flicker noise is detected, a correction value for suppressing the flicker noise; and applies the correction value to image data of the same type as the image data selected, wherein the apparatus selects image data being captured with a shutter speed not having a predetermined value, from among the plurality of image data.

11 Claims, 5 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method, and in particular relates to a technique for suppressing the influence that environmental light during image capture has on an image.

Description of the Related Art

When an image is captured using a solid-state image sensor such as a CMOS image sensor under environmental light with fluctuating brightness (a flickering light source), image quality deteriorates in some cases due to changes in the brightness of the environmental light. As a typical example, it is known that unevenness in brightness and color tone occurs in an image captured under fluorescent lighting. Unevenness in brightness and color tone occurs according to the relationship between the blinking timing of the fluorescent lighting and the accumulation (exposure) period of the image sensor. In particular, when capturing an image using a line exposure sequential readout (rolling shutter) scheme, significant unevenness is likely to occur since the accumulation period is different for each line.

A method of making the accumulation time an integer multiple of the blinking period of the light source is known as this kind of method for suppressing deterioration of image quality (flicker noise) caused by a flicker light source. For example, if a commercial power supply frequency is 50 Hz, the accumulation time (shutter speed) is set in accordance with the blinking period (100 Hz) of a light source to an integer multiple of the blinking period of the light source, such as $1/100$ second. Also, a method of detecting periodic change in brightness (hereinafter called "flickering") caused by a flicker light source (flicker detection), and correcting the brightness of the image so as to cancel out the detected flicker is also known.

Here, for example, if it is necessary to perform multiple instances of image capture while changing the exposure time, as in bracket image capture or image capture for generating an HDR image, it is not possible to set an exposure time with which flicker noise can be suppressed in some cases. Also, due to the exposure changing for each capture, the accuracy of flicker detection decreases and sufficient correction cannot be performed in some cases.

Japanese Patent Laid-Open No. 2014-179924 proposes a configuration in which a different flicker detector is used for each image with different exposure conditions.

The flicker detectors can also be realized as hardware circuits or software executed by a programmable processor. However, if the multiple flicker detectors are realized as hardware circuits, the scale of the hardware (that is, the mounting area and cost) will increase. Also, if the multiple flicker detectors are realized as software, the processing load of the processor (that is, the cost and power consumption of the processor) increases.

SUMMARY OF THE INVENTION

The present invention provides an image processing apparatus and an image processing method that can accurately detect and/or suppress flicker in multiple images with different exposure conditions using a simple configuration.

According to an aspect of the present invention, there is provided an image processing apparatus, comprising: a processor that executes instructions stored in a memory and, when executing the instructions, functions as: an acquisition unit configured to acquire a plurality of image data captured using different exposures; a selection unit configured to select an image data on which flicker noise detection is to be performed among the plurality of image data; a detection unit configured to apply flicker noise detection processing to the image data selected by the selection unit; a computation unit configured to, if flicker noise is detected by the detection unit, compute a correction value for suppressing the flicker noise; and a correction unit configured to apply the correction value to image data of the same type as the image data selected by the selection unit, wherein the selection unit selects image data being captured with a shutter speed not having a predetermined value, from among the plurality of image data.

According to another aspect of the present invention, there is provided an image processing method comprising: acquiring a plurality of image data captured using different exposures; selecting an image data on which flicker noise detection is to be performed among the plurality of image data; applying flicker noise detection processing to image data selected in the selecting; computing, if flicker noise is detected in the detecting, a correction value for suppressing the flicker noise; and applying the correction value to image data of the same type as the image data selected in the selecting, wherein in the selecting, image data being captured with a shutter speed not having a predetermined value is selected from among the plurality of image data.

According to a further aspect of the present invention, there is provided a non-transitory computer-readable medium storing a program for causing a computer to function as an image processing apparatus, comprising: an acquisition unit configured to acquire a plurality of image data captured using different exposures; a selection unit configured to select an image data on which flicker noise detection is to be performed among the plurality of image data; a detection unit configured to apply flicker noise detection processing to the image data selected by the selection unit; a computation unit configured to, if flicker noise is detected by the detection unit, compute a correction value for suppressing the flicker noise; and a correction unit configured to apply the correction value to image data of the same type as the image data selected by the selection unit, wherein the selection unit selects image data being captured with a shutter speed not having a predetermined value, from among the plurality of image data.

Further features of the present invention will become apparent from the following description of exemplary embodiments with reference to the attached drawings.

DESCRIPTION OF THE EMBODIMENTS

Figure 1:
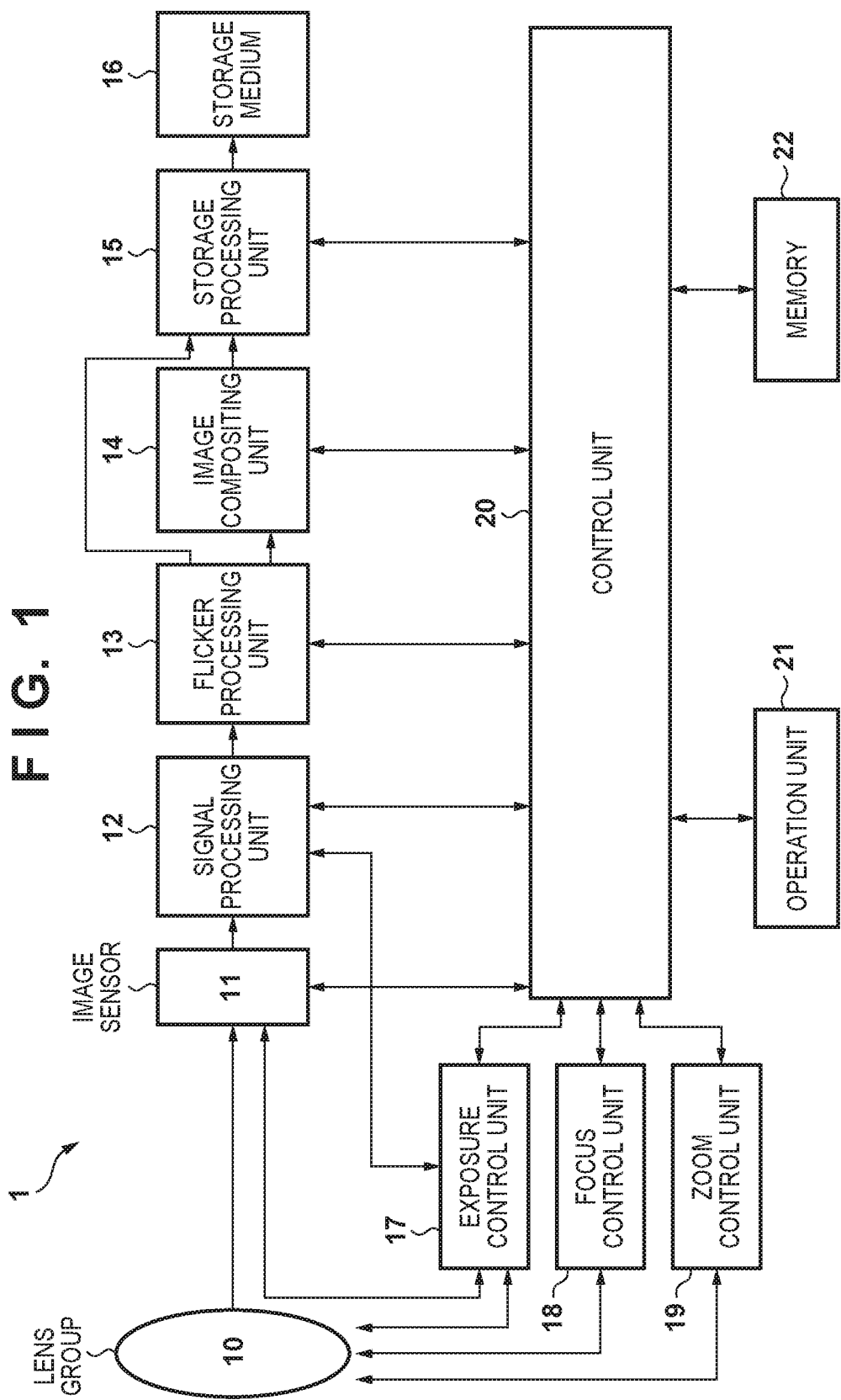
FIG. 1 is a diagram of a system configuration of a digital camera according to an embodiment.

Exemplary embodiments of the present invention will now be described in detail in accordance with the accompanying drawings. Note that the following embodiments do not limit the invention according to the claims. Also, although multiple features are described in the embodiments, not all of them are essential to the invention, and the multiple features may also be combined as appropriate. Furthermore, in the accompanying drawings, identical or similar configurations are denoted by identical reference numerals, and redundant description is omitted.

Also, hereinafter, a digital camera 1 serving as an example of the image processing apparatus according to the present invention (an apparatus capable of implementing the image processing method according to the present invention) will be described. However, the present invention can be implemented in a general computer device. Examples of such an electronic device include, but are not limited to, an image capture apparatus, a personal computer (including a tablet terminal), a smartphone, a game device, a media player, a robot, and a household electric appliance.

FIG. 1 is a block diagram showing an example of a functional configuration of the digital camera 1 according to an embodiment. Note that functional blocks having names that end in "unit" in FIG. 1 can be realized using hardware circuits, software executed by a programmable processor, or a combination thereof.

A lens group 10 includes multiple optical lenses including movable lenses such as a focus lens and a magnification lens, a mechanism for driving the movable lenses, and an aperture and/or neutral-density filter. The lens group 10 need not be detachable. The lens group 10 forms an image capture optical system that forms an optical image of a subject on an imaging surface of the image sensor 11. Note that although a configuration in which the lens group 10 is provided integrally with the digital camera 1 according to the present embodiment was described, it is also possible to use a configuration in which, for example, a lens unit including the lens group 10 can be attached to and detached from the digital camera 1.

The image sensor 11 has multiple pixels arranged in two dimensions. Each pixel has one or more photoelectric conversion element and generates an electric signal corresponding to an incident light amount. Note that in the present embodiment, it is assumed that the image sensor 11 is an image sensor employing a line exposure sequential readout (rolling shutter) scheme. Also, the image sensor 11 has an A/D conversion circuit, and electric signals generated by the pixels are read out as digital values (image data). The image data read out from the image sensor 11 is supplied to a signal processing unit 12.

The signal processing unit 12 applies predetermined signal processing to the image data and outputs the resulting image data to which the signal processing was applied to a flicker processing unit 13. Also, the signal processing unit 12 outputs the information obtained by applying the signal processing to the image data to a control unit 20. Here, the signal processing applied by the signal processing unit 12 includes color interpolation processing, correction processing, detection processing, evaluation value computation processing, and the like. Color interpolation processing is processing for interpolating values of color components that are not included in the image data read out from the pixels, and is also called de-mosaic processing. Correction processing includes processing for correcting the luminance of a pixel, processing for correcting an optical aberration of the lens group 10, processing for correcting color, and the like. The detection processing includes processing for detecting and tracking a characteristic region (e.g., a facial region or a body region), processing for recognizing a person, and the like. Evaluation value computation processing is processing for computing an evaluation value to be used in automatic exposure control processing and automatic focus detection processing performed by the control unit 20. For example, later-described luminance information of a subject (subject luminance information) can be computed as an evaluation value for automatic exposure control. Note that these are merely examples, and the signal processing applied by the signal processing unit 12 is not limited.

The flicker processing unit 13 detects fluctuation in the brightness of a light source (flicker noise or flicker component) based on the image data, applies correction for canceling out the flicker noise to the image data, and outputs the result to an image compositing unit 14. Details of the configuration and operation of the flicker processing unit 13 will be described later. Note that if image compositing is not necessary as with bracket image capture, the flicker processing unit 13 may output the image data to a storage processing unit 15, or may output the image data input by the image compositing unit 14 to the storage processing unit 15 as-is.

The image compositing unit 14 generates data of an HDR image of one frame based on multiple frames' worth of image data to be used to generate an HDR image, and the image compositing unit 14 outputs the data to the storage processing unit 15. The image compositing unit 14 applies non-linear gradation conversion processing corresponding to an exposure difference between the plurality of image data, and thus adjusts the luminance of the image data of the respective frames. Thereafter, the image compositing unit 14 composites the image data of the frames based on a compositing proportion determined for each pixel position based on the luminance value of the data of the corresponding pixel position, for the image data of the respective frames. Note that the multiple frames' worth of image data to be composited can be stored in a memory in the image compositing unit 14.

Alternatively, the multiple frames' worth of image data to be composited may be stored in the memory 22 through the control unit 20. In this case, the image data is output from the flicker processing unit 13 to the control unit 20, and the control unit 20 stores the image data in the memory 22. Then, the image compositing unit 14 references the image data stored in the memory 22 to execute determination of the compositing proportion and generation of a composite image. Note that it is also possible to use a configuration in which the generation of the composite image is executed by an external device connected to the digital camera 1, instead of a configuration in which the generation of the composite image is executed inside of the digital camera 1.

The storage processing unit 15 generates image data for storage and additional information conforming to a predetermined storage format, based on the image data supplied from the flicker processing unit 13 or the image compositing unit 14. Also, the storage processing unit 15 stores an image data file including the image data and the additional information in the storage medium 16. The storage processing unit 15 can apply encoding processing when generating the image data for storage. For example, the storage medium 16 is a semiconductor memory card.

The control unit 20 includes a programmable processor, and the control unit 20 controls the operation of the units and realizes the various functions of the digital camera 1 by reading out a program stored in a non-volatile storage medium and executing the program. Note that the non-volatile storage medium and the memory from which the program is read out may be included in the control unit 20 or may be a portion of the memory 22.

The control unit 20 executes automatic exposure control processing and automatic focus detection processing based on the evaluation values computed by the signal processing unit 12. The control unit 20 determines the image capture conditions (aperture value and/or ND filter to be used, shutter speed (charge accumulation time), and image capture sensitivity) using the automatic exposure control processing, and controls the aperture and ND filter through the exposure control unit 17. Also, the control unit 20 drives a focus lens through the focus control unit 18 using automatic focus detection processing and adjusts the focal length of the lens group 10. Note that in the present embodiment, 1 Ev in units of APEX (additive system of photographic exposure) is set as one step of exposure (exposure amount).

Also, the control unit 20 monitors an operation unit 21, which is the collective name of the input devices provided in the digital camera 1, and when operation of the operation unit 21 is detected, the control unit 20 executes an operation corresponding to the detected operation. For example, upon detecting an operation of a zoom lever included in the operation unit 21, the control unit 20 moves the magnification lens through the zoom control unit 19 by the direction and amount corresponding to the operation of the zoom lever, and changes the focal length of the lens group 10.

Hereinafter, an operation in an HDR image generation mode will be described as an example of an operation for performing multiple instances of image capture while changing the exposure. The HDR image generation mode is a mode in which an HDR image frame of one frame is generated based on image data of multiple frames captured while changing the exposure conditions. Specifically, image data of multiple frames is composited to generate one HDR image frame. Although it is assumed here that an HDR moving image composed of HDR image frames is generated and stored, it is also possible to use still image capture.

Also, in the present embodiment, correct exposure determined through automatic exposure control processing, and under-exposure in which the exposure amount is smaller than that of correct exposure are used alternatingly as multiple exposure conditions for generating HDR image frames. However, it is also possible to use two types of exposure, namely correct exposure and over-exposure, in which the exposure amount is greater than that of correct exposure, or to use three types of exposure, namely correct exposure, under-exposure, and over-exposure.

Figure 2A:
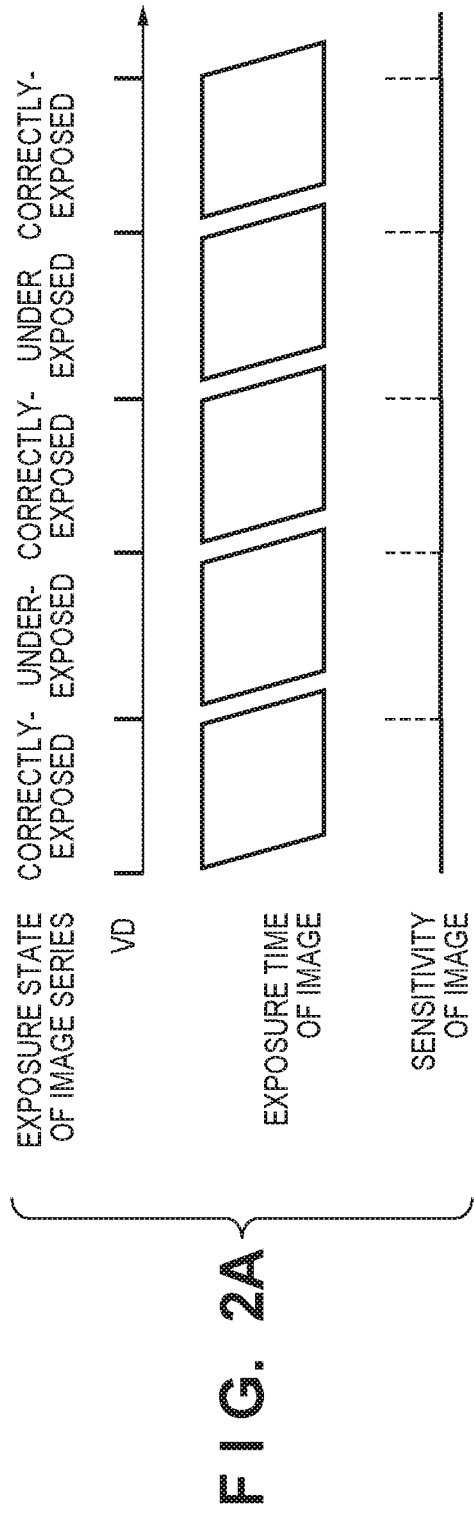
FIGS. 2A and 2B show examples of an image series of images in an HDR image generation mode according to an embodiment.
Figure 2B:
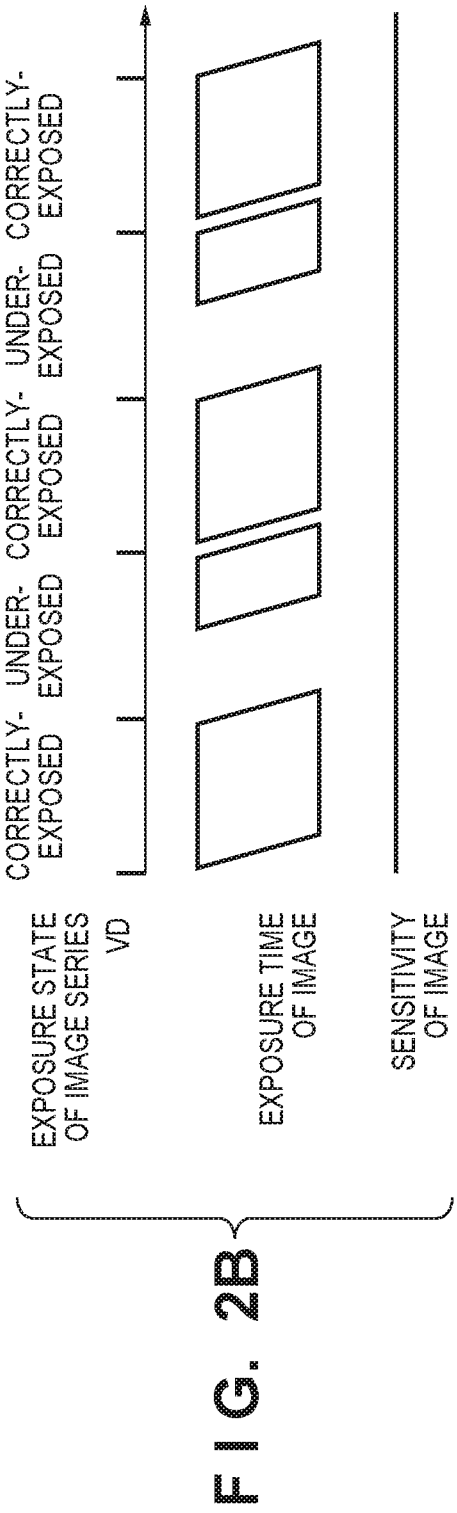

FIG. 2A shows a relationship between the exposure states of the frames in the HDR image generation mode and the timings of the charge accumulation (exposure) periods for each line of the image sensor 11. FIG. 2A shows a case in which the exposure amount for under-exposure is realized according to an image capture condition in which the image capture sensitivity is made lower than that for correct exposure. On the other hand, if the image capture sensitivity cannot be lowered, such as in a case in which the subject is bright, the exposure amount for under-exposure is realized by making the exposure time shorter than that for correct exposure, as shown in FIG. 2B. Note that as a general rule, the aperture is not changed since the depth of field changes when the aperture is changed. Note that in FIGS. 2A and 2B, VD indicates a vertical drive signal (or a vertical synchronizing signal).

The image compositing unit 14 applies non-linear conversion, for example, to two frames' worth of image data obtained through image capture using two types of exposure conditions, so as to obtain the image data in the same exposure state, and thereafter executes compositing processing. There is no particular limitation on the compositing method for generating an HDR image, and a known method can be used thereas. For example, it is possible to use a method in which the compositing proportion is determined according to the relationship shown in FIG. 3 for each pixel according to the value of the image data of the corresponding pixel position, and the image data is composited with the determined compositing proportion.

Figure 3:
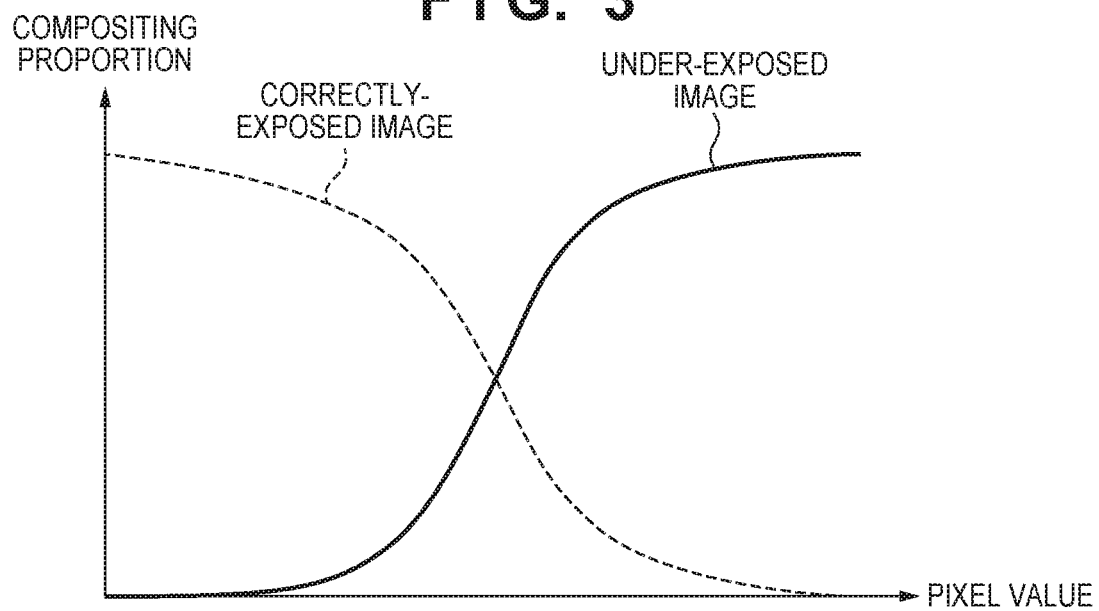
FIG. 3 shows compositing proportions for an HDR image generation mode according to an embodiment.

Regarding the compositing proportions shown in FIG. 3, the compositing proportion of image data for correct exposure is high for pixels with low luminance in the composited image, and the compositing proportion of image data for under-exposure is high for pixels with high luminance in the composited image. When the compositing proportion is determined in this way, an HDR image is obtained in which low-luminance portions have a good S/N ratio while saturation is avoided for high-luminance portions. Note that the compositing proportions shown in FIG. 3 are merely examples, and the compositing proportions may also be determined using another method.

Figure 4:
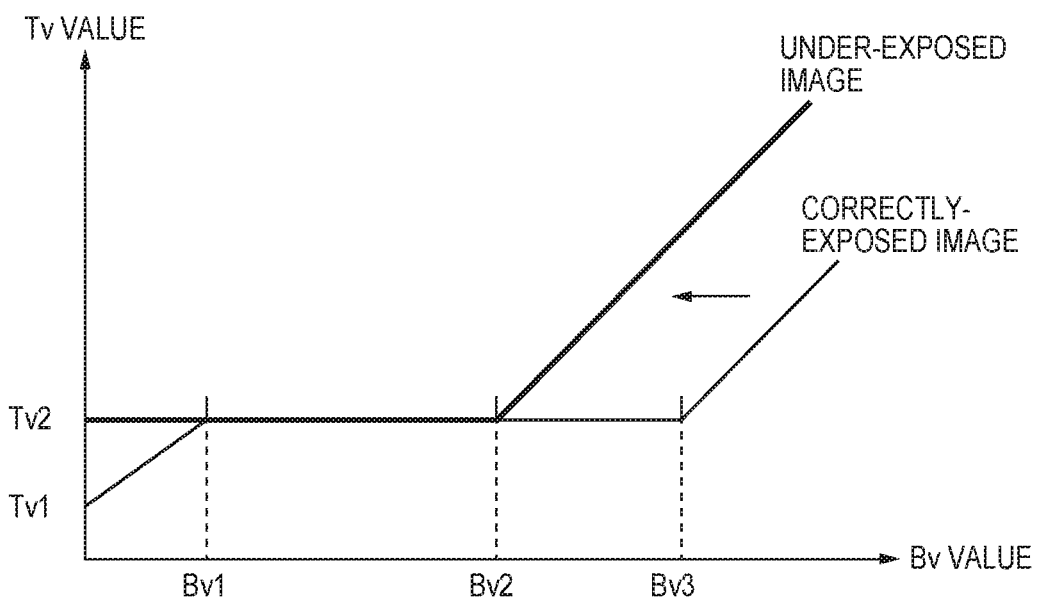
FIG. 4 is a Bv-Tv diagram of an exposure control specification for an HDR image generation mode according to an embodiment.

FIG. 4 shows an example of program lines for exposure control in which flicker noise removal is given priority, the exposure control being used in the HDR image generation mode. Here, FIG. 4 shows program lines showing changes in shutter speed (accumulation time) (Tv values) according to subject luminance values (Bv values) obtained by the signal processing unit 12, and FIG. 4 shows two program lines, namely one for correct exposure and one for under-exposure. Note that the Bv values indicated on the horizontal axis in FIG. 4 have higher luminances the further to the right they are in the drawing, and the Tv values indicated on the vertical axis in FIG. 4 have higher shutter speeds (higher speeds) the higher up they are in the drawing.

In the example shown in FIG. 4, in the program line for correct exposure, if the Bv value is at its minimum, the shutter speed is Tv1, and if the Bv value rises to Bv1, the shutter speed is changed to Tv2. Thereafter, the shutter speed is maintained at Tv2 until the Bv value reaches Bv2 (as the Bv value rises, the aperture value (Av value) is increased, or the image capture sensitivity (Sv value) is reduced). In the range in which the Bv value is Bv3 or more, the shutter speed can no longer be maintained at Tv2, and therefore the shutter speed is a value higher than (faster than) Tv2.

The program lines shown in FIG. 4 are examples of program lines in which priority is given to maintaining the shutter speed Tv2 as much as possible. The program lines in FIG. 4 function as program lines in which flicker noise removal is given priority by setting the shutter speed at which the flicker noise can be suppressed to Tv2 according to the frequency of the flicker noise detected by the flicker processing unit 13.

For example, if the frequency of a commercial AC power supply is 60 Hz, flicker noise having a blinking frequency of 120 Hz is detected by the flicker processing unit 13. In this case, by setting Tv2 to $\frac{1}{120}$ second (or somewhere in the vicinity thereof), the flicker noise can be suppressed in a range in which the subject luminance is Bv1 to Bv3 in image capture with correct exposure. Similarly, if the frequency of a commercial AC power supply is 50 Hz, flicker noise having a blinking frequency of 100 Hz is detected by the flicker processing unit 13. In this case, it is sufficient to set Tv2 to 1/100 second (or somewhere in the vicinity thereof).

On the other hand, the program line for under-exposure corresponds to a program line for correct exposure that has been shifted a predetermined amount in the direction indicated by the arrow. Accordingly, in the program line for correct exposure and the program line for under-exposure, the shutter speeds are different for the low-luminance portions (<Bv1) and the high-luminance portions (>Bv2). Note that the program line shown in FIG. 4 is merely an example, and it is also possible to use a program line in which the number of shutter speeds is greater, or in which control by means of the aperture or sensitivity is not performed.

If flicker noise is detected by the flicker processing unit 13, by setting Tv2 according to the blinking frequency, the flicker noise can be suppressed in the range of subject luminance in which image capture at Tv2 is possible. However, if the subject luminance is less than Bv1 or is Bv3 or more during image capture with correct exposure, and if the subject luminance is Bv2 or more during image capture with under-exposure, the shutter speed cannot be set to Tv2. In this case, as will be described later, the flicker noise included in the captured image needs to be suppressed through image processing.

Figure 5:
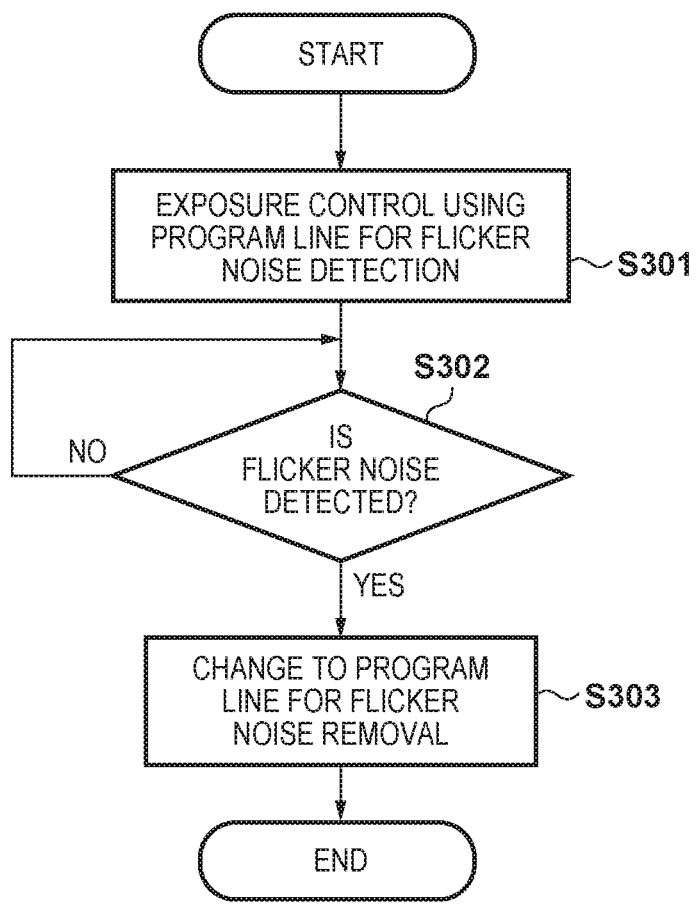
FIG. 5 is a flowchart of flicker detection according to an embodiment.

An exposure control operation performed based on the detection of flicker noise will be described using the flowchart shown in FIG. 5. This processing can be implemented using moving image capture for EVF display, which is executed during image capture standby, for example, in the case where the HDR image generation mode has been set, or a flicker reduction setting has been performed, for example. However, this processing may also be executed at another timing.

First, in step S301, the control unit 20 makes the program line used in exposure control into a program line for flicker noise detection in order to detect the flicker noise. The program line may be a program line in which a shutter speed (e.g., 1/250 seconds or less) that is faster than an envisioned frequency of flicker noise (e.g., 100 Hz or 120 Hz) is used as much as possible.

Data of a captured frame image is supplied from the signal processing unit 12 to the flicker processing unit 13 through the above-described processing. The flicker processing unit 13 applies flicker noise detection processing (described in detail later) to the image data that is supplied. If flicker noise is detected, the flicker processing unit 13 notifies the control unit 20 that flicker noise was detected, and notifies the control unit 20 of the frequency of the detected flicker noise as well.

In step S302, if there is a notification from the flicker processing unit 13 indicating that flicker noise was detected, the control unit 20 advances the processing to step S303. On the other hand, if there is no notification indicating that flicker noise was detected, the control unit 20 does not do anything in particular (moving image capture using a program line for flicker noise detection is continued).

In step S303, the control unit 20 switches the program line to be used in exposure control to a program line for maintaining as much as possible the shutter speed at which the detected flicker noise can be suppressed (a program line for flicker noise removal). Also, the value of Tv2 in the program line of FIG. 4, which is used in the HDR image generation mode, is set to a shutter speed at which the detected flicker noise can be suppressed.

In this manner, the control unit 20 can change the properties of the program line or set (change) the value of the shutter speed (Tv value) in the program line based on the frequency of the detected flicker noise. Accordingly, the control unit 20 enables image capture under exposure conditions in which flicker noise is reduced.

Figure 7:
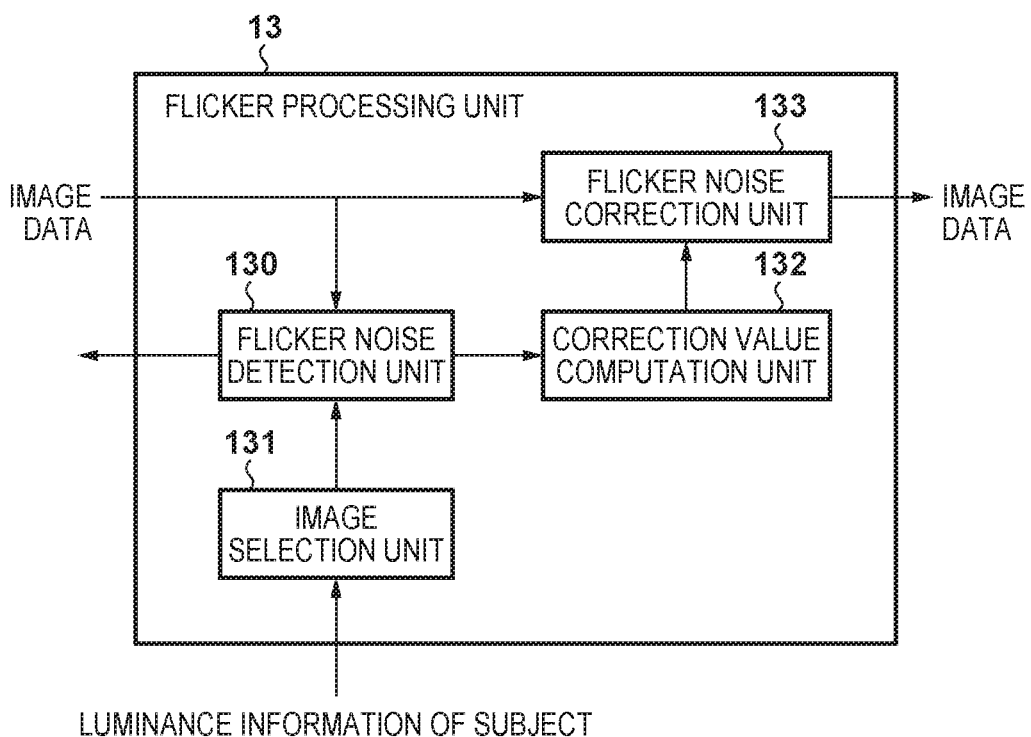
FIG. 7 is a diagram of an internal configuration of a flicker processing unit 13 according to an embodiment.

FIG. 7 is a block diagram showing an example of a functional configuration of the flicker processing unit 13. The flicker noise detection unit 130 detects flicker noise based on image data. An image selection unit 131 determines image data in which the flicker noise detection unit 130 detects flicker noise from among the image data of the multiple frames with different exposure conditions. A correction value computation unit 132 computes (determines) a correction value for suppressing the detected flicker noise. A flicker noise correction unit 133 applies the correction value computed by the correction value computation unit 132 to the image data and outputs the result to the storage processing unit 15. Flicker noise detection, computation of a correction value for suppressing flicker noise, and application of the correction value, which are performed by the flicker processing unit 13, correspond to the suppression of flicker noise through image processing.

Details of the operation of the flicker noise detection unit 130 will be described. First, a component that does not change over time (stationary component) needs to be specified in order to detect flicker noise based on the image data. The stationary component can be specified according to Equation 1 below, for example.

$$\text{mem} = \text{ave} \times k + \text{mout} \times (1-k) \qquad \text{(Equation 1)}$$

Here, mem is the value of the stationary component, ave is the signal value of the color component of each row of input image data, k is a filter coefficient of a cyclic low-pass filter, and mout is the value of mem obtained for the image data of the previous frame. The stationary component in the time direction can be specified by executing the computation of Equation 1 on each line of the input image data.

Also, by dividing the signal values of the lines of the input image data by the specified stationary component, it is possible to detect flicker noise (fluctuation component in the time direction included in the image data). A model (flicker model) of the fluctuation property of the chronological signal level in a direction orthogonal to the line (vertical direction) can be generated based on the flicker noise component detected in each line.

For example, the flicker model can be approximated as a periodic function having an amplitude w, a frequency f, and a phase θ in the perpendicular direction. Since the voltage fluctuation of the AC power supply that drives the light source has the properties of a trigonometric function, it is common to approximate the flicker model using a sine wave (or a cosine wave), but it is also possible to use another periodic ideal function.

The frequency f of the function for approximating the flicker model can be determined using the image capture frame rate and a frequency of a power supply that drives the environmental light. Also, the phase of the detected noise at each row can be computed by setting the phase θ to 0 for a predetermined line (e.g., a line in which the fluctuation rate is 1 and the change amount of the fluctuation rate is 1 in the vertical direction). Also, the amplitude w can be computed based on the fluctuation rate of the lines in which the computed phase θ corresponds to π/2 and 3π/2. The flicker model generated based on the input image data represents flicker noise that is included in the input image data.

The correction value computation unit 132 computes (determines) the correction value (correction gain) for each line based on the flicker model generated in this manner. With an image sensor employing a line exposure sequential readout (rolling shutter) scheme, the level of flicker noise differs for each line since the exposure period differs for each line (pixel row). For this reason, the correction value computation unit 132 computes a correction value for each line. Note that in the case where the image sensor 11 is configured to be able to simultaneously read out multiple lines, the computation of the correction value need only be executed for each of multiple lines with the same accumulation period.

The correction value is a coefficient for canceling out the change in brightness for each line and obtaining the brightnesses of the lines in the same condition. If the flicker model is approximated using a function in which a sine wave or cosine wave is used, a function value corresponding to a phase obtained by shifting the phase of the target line by π can be computed as the correction coefficient. Also, if the detected flicker component has been normalized to 1, the inverse of the detected flicker component may also be used as the correction coefficient. Note that if the image sensor 11 is provided with a color filter, the correction value can be computed for each pixel group provided with a color filter of the same color in each line.

The flicker noise correction unit 133 corrects the flicker noise included in the image data by applying the correction value computed by the correction value computation unit 132 to the image data. Note that according to the units targeted by the correction value, the flicker noise correction unit 133 applies the same correction value to all of the image data in one line, or applies a correction value to each of the plurality of image data corresponding to pixels provided with a color filter of the same color among the plurality of image data in one line.

Next, the image selection unit 131 will be described. As described with reference to FIG. 4, in the program line used in the HDR image generation mode, there is a region of subject luminance in which the under-exposed image and the correctly-exposed image are captured with different shutter speeds. If the subject luminance corresponds to this region, flicker noise will be included only in one image (alternatively, the difference in the level of flicker noise will increase between the images).

Also, if the shutter speed increases, the difference between the level of the flicker noise included in the image data and the level obtained based on the flicker model will increase in some cases. This is because the light emission amount of the substance used as the light source has a response characteristic with respect to the change in the input voltage. For example, if the input voltage decreases or increases, the voltage-light emission amount characteristic will be different or the voltage-light emission amount characteristic will be different from the other portions only near a predetermined voltage (e.g., 0 [V]). With this kind of light source, it is not easy to approximate the actual flicker noise using a function. Furthermore, if the shutter speed reaches a high speed, exposure is performed in a period that is a small portion of the blinking period of the light source, and therefore the error between the flicker model and the actual flicker noise tends to increase. In this case, the accuracy of correcting the flicker noise decreases. Accordingly, in the present embodiment, correction of the flicker noise through image processing is limited to image data obtained by performing image capture at a shutter speed in a range in which there is not a large error between the flicker model and the actual flicker noise. In other words, suppression of flicker noise using image processing is executed with a predetermined shutter speed set as an upper limit.

Figure 6:
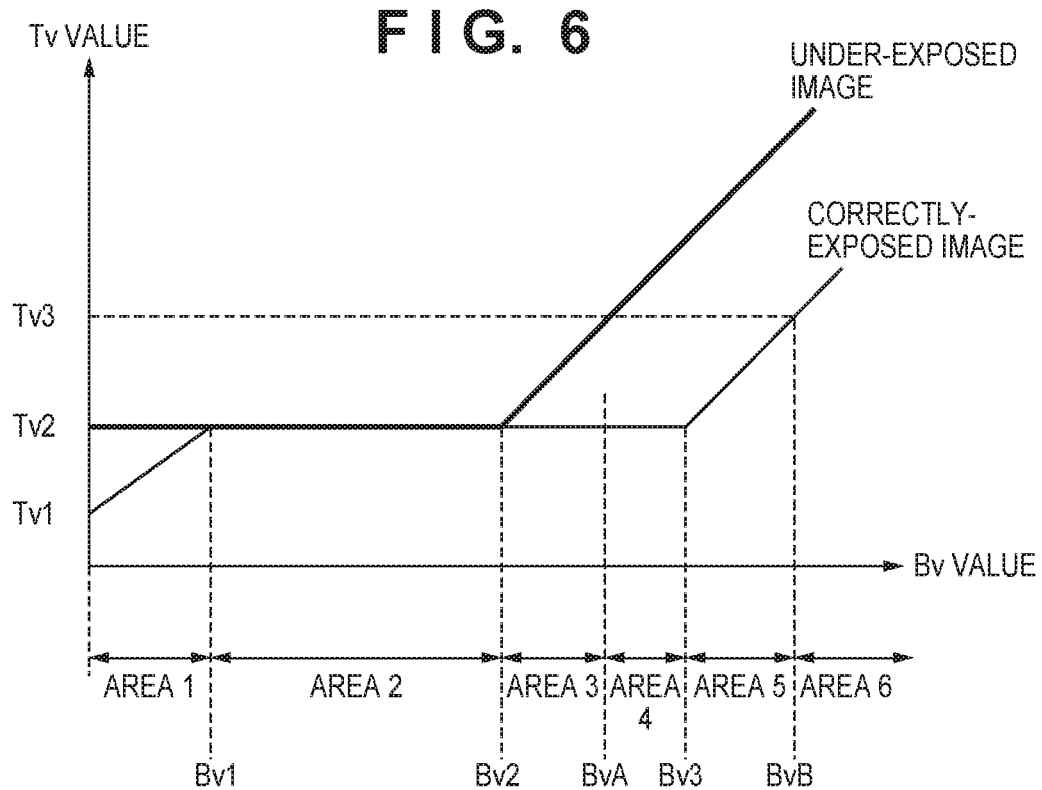
FIG. 6 shows an example of division of subject luminances into areas depending on whether or not flicker correction is possible in an embodiment.

FIG. 6 is obtained by dividing the range of the subject luminance in the program line of FIG. 4 into multiple areas with attention given to control for applying correction of the flicker noise using image processing.

In area 1, the flicker noise can be suppressed in an image captured with under-exposure (under-exposed image) by performing image capture at the shutter speed Tv2. On the other hand, in the image captured using correct exposure (correctly-exposed image), the shutter speed is not Tv2, and therefore flicker noise is included. In this case, suppression of flicker noise through image processing is implemented on the correctly-exposed image.

Since the flicker noise in area 2 can be suppressed through the image capture conditions in both the under-exposed image and the correctly-exposed image, suppression of flicker noise through image processing is not needed in area 2.

The flicker noise can be suppressed through the image capture conditions for areas 3 and 4 in the correctly-exposed image, but the flicker noise is included in the under-exposed image. In areas 3 and 4, the shutter speed at the time of capturing the under-exposed image is faster than Tv2, but since the effect of suppressing the flicker noise through image processing is sufficiently obtained for area 3, suppression of the flicker noise through image processing is implemented on the under-exposed image. On the other hand, since the shutter speed at the time of image capture is Tv3 or more and the effect of suppressing the flicker noise through image processing is insufficient for area 4, suppression of the flicker noise through image processing is not implemented on the under-exposed image.

The flicker noise is included in both the under-exposed image and the correctly-exposed image for area 5. Since the shutter speed at the time of image capture exceeds Tv3, suppression of flicker noise through image processing is not implemented on the under-exposed image. On the other hand, since the shutter speed does not exceed Tv3, suppression of flicker noise through image processing is implemented on the correctly-exposed image.

The flicker noise is included in both the under-exposed image and the correctly-exposed image in area 6. However, since the shutter speed at the time of image capture exceeds Tv3 in both the under-exposed image and the correctly-exposed image, suppression of flicker noise through image processing is not implemented.

The image selection unit 131 is provided in order to realize application control for suppressing flicker noise through image processing. That is, the image selection unit 131 selects image data of a type in which the shutter speed at the time of image capture is not a predetermined value (Tv2) as the target of suppression of flicker noise through image processing according to the subject luminance, and notifies the flicker noise detection unit 130 of the image data. Also, the flicker noise detection unit 130 performs flicker noise detection on the notified image data in which flicker noise is to be suppressed. Note that the flicker noise detection unit 130 may also distinguish whether the image data input to the flicker processing unit 13 is data for an under-exposed image or data for a correctly-exposed image according to the input timing, or notification of whether the image data is data for an under-exposed image or data for a correctly-exposed image may be performed from the control unit 20 to the flicker noise detection unit 130. Also, the correction value computation unit 132 computes a correction value for image data of a type in which flicker noise was detected. Also, the flicker noise correction unit 133 applies correction values to the image data of the type for which the correction values were computed.

Specifically, the subject luminance computed by the signal processing unit 12 is supplied directly or through the control unit 20 to the image selection unit 131. Also, information obtained by associating the subject luminance and the type of image to be selected is stored in advance for each type of program line to be used in the image selection unit 131. Then, information for designating the program line is provided by the control unit 20 to the image selection unit 131. The image selection unit 131 determines the type of the image to be selected based on the designated program line and subject luminance, and notifies the flicker noise detection unit 130 of the determined type.

The image selection unit 131 need only perform notification of the type of the image data for which suppression of the flicker noise through image processing is to be performed for each of the above-described areas 1 to 6 to the flicker noise detection unit 130. For this reason, if the subject luminance corresponds to area 2, the flicker noise detection unit 130 does not need to be notified of any image data.

However, as described with reference to Equation 1, past information is needed in the detection of flicker noise. Accordingly, even if the correction value does not need to be computed, it is better to cause the flicker noise detection unit 130 to execute flicker noise detection processing in order to stably detect the flicker noise.

For example, if the subject luminance changes from area 2 to area 1, the computation of the correction values needs to be started for the correctly-exposed image. Also, if the subject luminance changes from area 2 to area 3, computation of the correction values needs to be started for the under-exposed image. When the subject luminance changes from area 2 to area 1 and then the detection of the flicker noise is started, it takes time for the stationary component to be stably detected. For this reason, if the subject luminance corresponds to a predetermined range from the boundary with area 1, the correctly-exposed image can be selected even if the subject luminance corresponds to area 2, and the flicker noise detection processing can be applied to the data for the correctly-exposed image. Similarly, if the subject luminance corresponds to a predetermined range from the boundary with area 3, the under-exposed image can be selected even if the subject luminance corresponds to area 2. Also, if the subject luminance corresponds to a predetermined range from the boundary with area 5, the correctly-exposed image can be selected even if the subject luminance corresponds to area 4.

Similarly, if the subject luminance corresponds to a predetermined range from the boundary with area 3, the under-exposed image can be selected even if the subject luminance corresponds to area 4. Also, if the subject luminance corresponds to a predetermined range from the boundary with area 5, the correctly-exposed image can be selected even if the subject luminance corresponds to area 6.

In the case of performing this kind of control for detecting the stationary component, the correction value computation unit 132 does not perform computation of the correction value on image data in which the maximum amplitude of the flicker noise (flicker model) detected by the flicker noise detection unit 130 is less than a predetermined value. Alternatively, the correction value computation unit 132 may also compute a correction value that does not influence the image data.

According to the program line shown in FIG. 4 (FIG. 6) and the control for each area shown in FIG. 6, the flicker noise detection unit 130 need only apply flicker noise detection processing on one of the under-exposed image and the correctly-exposed image, regardless of the subject luminance. Accordingly, there is no need to provide multiple flicker noise detection units 130 and correction value computation units 132, which is more advantageous than a configuration in which multiple processing units are provided, in terms of circuit scale, component cost, and processing cost.

Note that although a configuration was described in which, in the program line described in the present embodiment, correction values for flicker noise of any one of the correctly-exposed image and the under-exposed image used to generate HDR image data are computed, but the present invention is not limited to such a configuration. For example, it is also possible to use a configuration in which flicker noise that occurs in both the under-exposed image and the correctly-exposed image is corrected based on a program line different from that shown in FIG. 4. In this case, regarding the flicker model detected by the flicker noise detection unit 130, the correct correction values for the under-exposed image and the correctly-exposed image need only be stored in advance in the memory 22, and the correction values need only be applied to the data for the images. For example, it is assumed that the difference in exposure between the under-exposed image and the correctly-exposed image is realized through a difference in Tv values. Since the degree of influence of the flicker noise that occurs in the image data differs according to the Tv value, the correction values corresponding to the Tv values need only be stored in advance in the memory 22 by associating the Tv values and the correction values (e.g., in a table format), for example. In this case, the correction value computation unit 132 may also include separate circuits for correctly-exposed images and under-exposed images.

Note that among the above-described operations, image capture operations including exposure control are not essential for the invention. For example, the present invention can be implemented also with an image processing apparatus having a configuration in which data for the under-exposed image and the correctly-exposed image, which is stored in the storage medium 16, is read out and supplied to the signal processing unit 12. Note that information relating to the program line used during image capture and the type of image (whether the image is an under-exposed image or a correctly-exposed image) need only be stored included in the header information or the like of the image data, for example.

As described above, according to the present embodiment, the image data on which flicker noise detection is to be performed according to the subject luminance is selected in the plurality of image data captured using different exposures. For this reason, it is possible to detect and correct flicker noise with a simple configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-000740, filed on Jan. 7, 2019, which is hereby incorporated by reference herein in its entirety.

What is claimed is:

1. An image processing apparatus, comprising:
a processor that executes instructions stored in a memory and, when executing the instructions, functions as:
an acquisition unit configured to acquire a plurality of image data captured using different exposures;
a selection unit configured to select an image data on which flicker noise detection is to be performed among the plurality of image data;
a detection unit configured to apply flicker noise detection processing to the image data selected by the selection unit;
a computation unit configured to, if flicker noise is detected by the detection unit, compute a correction value for suppressing the flicker noise; and
a correction unit configured to apply the correction value to image data of the same type as the image data selected by the selection unit,
wherein, in a case where image data being captured with a shutter speed not having a predetermined value is included in the plurality of image data, the selection unit selects the image data from among the plurality of image data,
wherein even if the plurality of image data are captured with a shutter speed having the predetermined value, if luminance information of a subject is within a predetermined range, the selection unit selects predetermined image data, and
wherein the predetermined range is set based on a subject luminance at which a shutter speed for capturing one of the plurality of image data is changed from the predetermined value to another value.

2. The image processing apparatus according to claim 1, wherein the predetermined value is a value corresponding to a frequency of a commercial AC power supply.

3. The image processing apparatus according to claim 1, wherein the selection unit performs the selection based on luminance information of a subject and information on a program line used for capturing image data.

4. The image processing apparatus according to claim 1, wherein if the plurality of image data are captured with a shutter speed having the predetermined value, the selection unit does not select image data.

5. The image processing apparatus according to claim 1, wherein if a maximum amplitude of the flicker noise detected by the detection unit is less than a predetermined value, the computation unit does not compute the correction value.

6. The image processing apparatus according to claim 1, wherein if a maximum amplitude of the flicker noise detected by the detection unit is less than a predetermined value, the computation unit sets the correction value to a value that does not influence image data.

7. An image processing method comprising:
acquiring a plurality of image data captured using different exposures;
selecting an image data on which flicker noise detection is to be performed among the plurality of image data;
applying flicker noise detection processing to image data selected in the selecting;
computing, if flicker noise is detected in the detecting, a correction value for suppressing the flicker noise; and
applying the correction value to image data of the same type as the image data selected in the selecting,
wherein in the selecting, in a case where image data being captured with a shutter speed not having a predetermined value is included in the plurality of image data, the image data is selected from among the plurality of image data,
wherein even if the plurality of image data are captured with a shutter speed having the predetermined value, if luminance information of a subject is within a predetermined range, the selection unit selects predetermined image data, and
wherein the predetermined range is set based on a subject luminance at which a shutter speed for capturing one of the plurality of image data is changed from the predetermined value to another value.

8. A non-transitory computer-readable medium storing a program for causing a computer to function as an image processing apparatus, comprising:
an acquisition unit configured to acquire a plurality of image data captured using different exposures;
a selection unit configured to select an image data on which flicker noise detection is to be performed among the plurality of image data;
a detection unit configured to apply flicker noise detection processing to the image data selected by the selection unit;
a computation unit configured to, if flicker noise is detected by the detection unit, compute a correction value for suppressing the flicker noise; and
a correction unit configured to apply the correction value to image data of the same type as the image data selected by the selection unit,
wherein, in a case where image data being captured with a shutter speed not having a predetermined value is included in the plurality of image data, the selection unit selects the image data from among the plurality of image data,
wherein even if the plurality of image data are captured with a shutter speed having the predetermined value, if luminance information of a subject is within a predetermined range, the selection unit selects predetermined image data, and wherein the predetermined range is set based on a subject luminance at which a shutter speed for capturing one of the plurality of image data is changed from the predetermined value to another value.

9. An image processing apparatus, comprising:
a processor that executes instructions stored in a memory and, when executing the instructions, functions as:
an acquisition unit configured to acquire first image data and second image data which are having different exposures by capturing a subject;
a detection unit configured to detect a flicker based on one of the first and second image data acquired by the acquisition unit; and
a correction unit configured to perform a gain correction on any of the first image data and the second image data for suppressing the detected flicker,
wherein, within the first image data and the second image data, the correction unit performs the gain correction on image data of which the luminance information of the subject is within the first range, and does not perform the gain correction on image data of which the luminance information of the subject is within a second range different from the first range, and
wherein, if the first image data and the second image data have the luminance information of the subject that is within the second range, the detection unit detects a flicker based on one of the first image data and the second image data the luminance information of the subject of which is closer to a boundary between the first range and the second range.

10. An image processing method comprising:
acquiring first image data and second image data which are having different exposures by capturing a subject;
detecting a flicker based on one of the acquired first and second image data; and
performing a gain correction on any of the first image data and the second image data for suppressing the detected flicker,
wherein, within the first image data and the second image data, the performing performs the gain correction on image data of which the luminance information of the subject is within the first range, and does not perform the gain correction on image data of which the luminance information of the subject is within a second range different from the first range, and
wherein, if the first image data and the second image data have the luminance information of the subject that is within the second range, the detecting detects a flicker based on one of the first image data and the second image data the luminance information of the subject of which is closer to a boundary between the first range and the second range.

11. A non-transitory computer-readable medium storing a program for causing a computer to function as an image processing apparatus, comprising:
an acquisition unit configured to acquire first image data and second image data which are having different exposures by capturing a subject;
a detection unit configured to detect a flicker based on one of the first and second image data acquired by the acquisition unit; and
a correction unit configured to perform a gain correction on any of the first image data and the second image data for suppressing the detected flicker,
wherein, within the first image data and the second image data, the correction unit performs the gain correction on image data of which the luminance information of the subject is within the first range, and does not perform the gain correction on image data of which the luminance information of the subject is within a second range different from the first range, and
wherein, if the first image data and the second image data have the luminance information of the subject that is within the second range, the detection unit detects a flicker based on one of the first image data and the second image data the luminance information of the subject of which is closer to a boundary between the first range and the second range.

* * * * *